United States Patent [19]

Scott et al.

[11] 3,945,177

[45] Mar. 23, 1976

[54] METHOD AND APPARATUS FOR CUTTING SUGAR CANE

[75] Inventors: Donald Alan Scott, Pershore, England; Colin Hudson, St. Thomas, Barbados

[73] Assignee: F. M. McConnell Ltd.

[22] Filed: July 24, 1974

[21] Appl. No.: 491,951

Related U.S. Application Data

[63] Continuation of Ser. No. 284,598, Aug. 29, 1972, abandoned.

[30] Foreign Application Priority Data

Nov. 19, 1971 United Kingdom............... 53957/71

[52] U.S. Cl. ..................... 56/12.7; 56/13.5; 56/503
[51] Int. Cl.² ......................................... A01D 35/26
[58] Field of Search .......... 56/503, 12.9, 13.9, 14.5, 56/327 R, 14.1, 12.7, 13.5

[56] References Cited
UNITED STATES PATENTS

| | | | |
|---|---|---|---|
| 3,136,108 | 6/1964 | Wood .................................. | 56/12.9 |
| 3,513,647 | 5/1970 | Johnston et al...................... | 56/14.5 |
| 3,585,754 | 6/1971 | Cortopassi .................... | 56/327 R X |
| 3,673,779 | 7/1972 | Scarnato ............................... | 56/503 |
| 3,791,114 | 2/1974 | Fowler................................. | 56/13.9 |

*Primary Examiner*—Russell R. Kinsey
*Attorney, Agent, or Firm*—Watson, Cole, Grindle & Watson

[57] ABSTRACT

A method of cutting sugar cane comprising the steps of passing in one direction through the growing cane a vehicle having mounted thereon two upwardly extending power driven combing elements spaced apart across the width of the vehicle; combing a narrow stretch of cane between the combing elements; flattening the cane beneath a flattening element mounted on the vehicle to the rear of the combing elements and spaced above the ground to extend transversely to the one direction; and severing the cane at its base by power driven rotating ground-following cutting means mounted on the vehicle to the rear of the flattening element.

Apparatus for carrying out this method includes, mounted on a propelling vehicle, two upwardly extending combing elements spaced apart across the width of the vehicle, a flattening element extending transversely to the direction of travel of the vehicle and spaced above the ground to the rear of the combing elements with respect to the direction of travel of the vehicle, a cutter mounted on the propelling vehicle to the rear of the flattening element, and means for transmitting a powered drive to the cutter, which cutter is adapted to sever, adjacent the ground, sugar cane flattened by the flattening element. The cutter includes a central rotatable hub assembly, a number of cutter blades extending outwardly from the lower end of the hub assembly, and means pivotally connecting the blades to the hub assembly along axes which permit each blade to swing up and down relative to the hub assembly and follow the contours of the ground along which the vehicle travels.

14 Claims, 8 Drawing Figures

METHOD AND APPARATUS FOR CUTTING SUGAR CANE

This is a continuation division, of application Ser. No. 284,598 filed Aug. 29th, 1972 and now abandoned.

FIELD OF THE INVENTION

The present invention relates to the cutting of sugar cane.

DESCRIPTION OF THE PRIOR ART

U.S. Pat. No. 2,949,717, issued Aug. 23, 1960, to W. L. Johannesen discloses a pick up mechanism for harvesters, in which there are provided two upwardly extending power driven combing elements to funnel the crop being harvested into a narrow stretch and to subsequently feed it to a transversely extending stationary sickle bar to be cut and conditioned. U.S. Pat. No. 3,513,647, issued May 26, 1970, to Edward J. Johnston et al. discloses an adjustable flick bar mechanism for such a cutting apparatus, in which the crop is flattened by a transversely extending flattening bar before being cut. If the teachings of these two patents are combined in view of a later U.S. Pat. No. 3,673,779, issued July 4, 1972, to Thomas J. Scarnato et al; there results a mower conditioner in which the crop is first funnelled between two power driven upwardly extending combing elements, is then flattened by a transversely extending flattening bar and is finally cut by rotary disc type mowers and thrown at high speed to the conditioning rollers.

Such apparatus however, would be developed with the sole aim of cutting crops (such as grain or grass) where the cutting speed is high, ground irregularities are few and — in general — the tops of the crop are the important harvestable commodity. Thus the cutting blades shown in the Scarnato patent are connected to a rotating drum by vertical pivots, the drum rotates at a high speed and the blades are allowed a limited amount of pivotal side to side movement and are thus directed radially outwardly of the drum by the very high centrifugal forces involved in the high speed rotation of the drum.

The apparatus according to the present invention, by way of contrast, is directed to the harvesting of growing sugar cane. Such cane is usually grown on ground comprising alternate ridges and furrows, with considerable variations in contour and incorporating rocks, stones, trash and other impediments to any harvesting vehicle. The canes are extremely tall and thick and, by the time they are ready for harvesting, may have become extremely tangled and extend in all directions and at all angles to the ground. In addition, the leafy tops of the sugar cane are not in general a valuable harvesting commodity — it is the cane stalk itself, and in particular the bottom 6 inches adjacent the base, which has the high sugar content.

Growing sugar cane has two weak points — the first of these is at the base of the leafy top of the cane stalk, and the second is at the very base of the stalk itself, i.e. adjacent the ground from which the cane grows. If an apparatus — such as that constructed from the prior art teachings reviewed above — were to be driven into a field of growing sugar cane, the high speed cutters taught by such disclosures would very rapidly become blunted in ploughing through the rubbish surrounding the base of the growing cane, and in particular the blade construction used would be totally unsuitable for following any ground irregularities or obstructions in its path.

Thus the most that could be hoped for with such prior art apparatus would involve setting the non-ground following, high speed rotating cutters at a level which would be so high, in order to ensure their continued operation, that the cane would not be severed adjacent its base. In particular, in many parts of the crop the bottom 6 inches or so of the cane (which as mentioned above has the highest sugar content of the cane stalk) would be missed completely.

SUMMARY OF THE INVENTION

The present invention provides apparatus for cutting sugar cane comprising, mounted on a propelling vehicle, two upwardly extending combing elements spaced apart across the width of the vehicle, a flattening element extending transversely to the direction of travel of the vehicle and spaced above the ground to the rear of the combing elements with respect to the direction of travel of the vehicle, a cutter mounted on the propelling vehicle to the rear of the flattening element, and means for transmitting a powered drive to the cutter, which cutter is adapted to sever, adjacent the ground, sugar cane flattened by the flattening element. The cutter includes a central rotatable hub assembly, a number of cutter blades extending outwardly from the lower end of the hub assembly, and means pivotally connecting the blades to the hub assembly along axes which permit each blade to swing up and down relative to the hub assembly and follow the contours of the ground along which the vehicle travels.

Thus, when an apparatus embodying the present invention is passed through growing sugar cane, the ground following cutter blades are rotated at slow speeds to completely minimize any centrifugal force effects and the blades are allowed to swing up and down to follow the contours of the ground along which the vehicle travels.

The invention also provides a method of cutting sugar cane comprising the steps of: passing in one direction through the growing cane a vehicle having mounted thereon two upwardly extending power driven combing elements spaced apart across the width of the vehicle; combing a narrow stretch of cane between the combing elements; flattening the cane beneath a flattening element mounted on the vehicle to the rear of the combing elements and spaced above the ground to extend transversely to the one direction; and severing the cane at its base by power driven rotating ground-following cutting means mounted on the vehicle to the rear of the flattening element.

It will be appreciated that, during the combing and flattening processes of this method, the growing cane will be subjected to localized stresses at its weak base point and many of the canes will already have been snapped or broken off adjacent the ground before the cutting blades even get to them. The cutting blades, which are not driven at a high speed nor are they sharpened, break the remaining canes at their weak base point as they pass through the cane crop.

BRIEF DESCRIPTION OF THE DRAWINGS

Referring to FIGS. 1, 2 and 8 a conventional tractor 10 carries on either side of its front part, brackets 11 and 12 such as are normally used for supporting a conventional front end loader. Pivotally mounted at 13 on the upper ends of the rear brackets 11 is a swinging support structure 14. The support structure 14 comprises, at each side of the tractor, side arms each comprising a forwardly extending limb 15 and a downwardly limb 16. As best seen in FIG. 2, the lower ends of the downwardly extending limbs 16 are bolted to a square section cross-bar 17, so that the limbs 16 may be adjusted along the length of the bar 17 so as to vary the distance between them, and between their associated combing elements 28 (to be described below).

Figure 1:
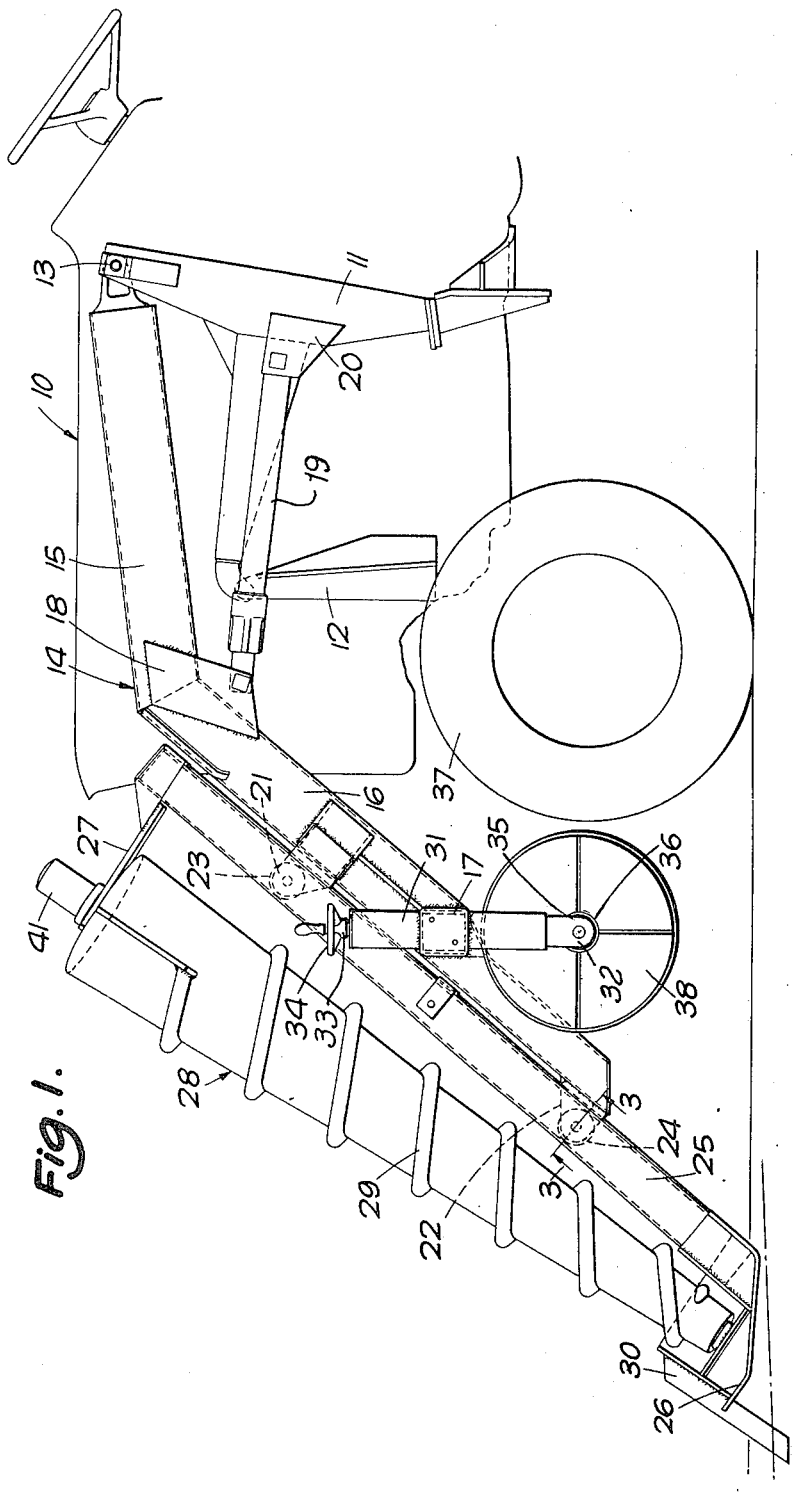
FIG. 1 is a side elevation of an apparatus mounted on a tractor for partially flattening growing sugar cane.

The junction between the limbs 15 and 16 at each side of the tractor has welded to it a plate 18 and an hydraulic ram 19 is pivotally connected between each plate 18 and a plate 20 on each bracket 11. Thus the support structure may be raised by extending the rams 19.

Each limb 16 has welded to it an upper bracket 21 and a lower bracket 22 on which are mounted pairs of rollers 23 and 24 respectively. The rollers 23 and 24 are received (see FIG. 3) within a square section beam 25 having a longitudinal slot 25' through which the brackets 21 and 22 may pass. The arrangement is such that the beams 25 may slide up and down on the limbs 16. A bracket mounted on each limb 16 may have a pin which engages a longitudinal closed ended slot in the side of each beam 25 to limit the extent of sliding movement of each beam relatively to the limb 16 on which it is mounted.

At its lower end, each beam 25 has secured to it a shoe 26 extending forwardly fo the beam.

Figure 2:
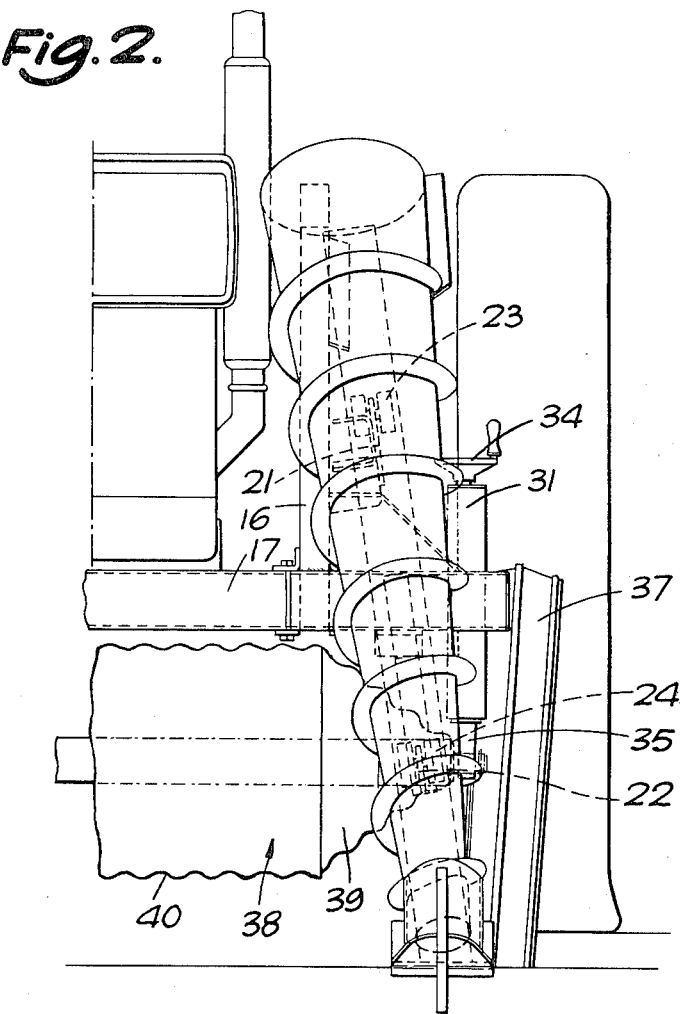
FIG. 2 is a half front elevation of the apparatus of FIG. 1.
Figure 8:
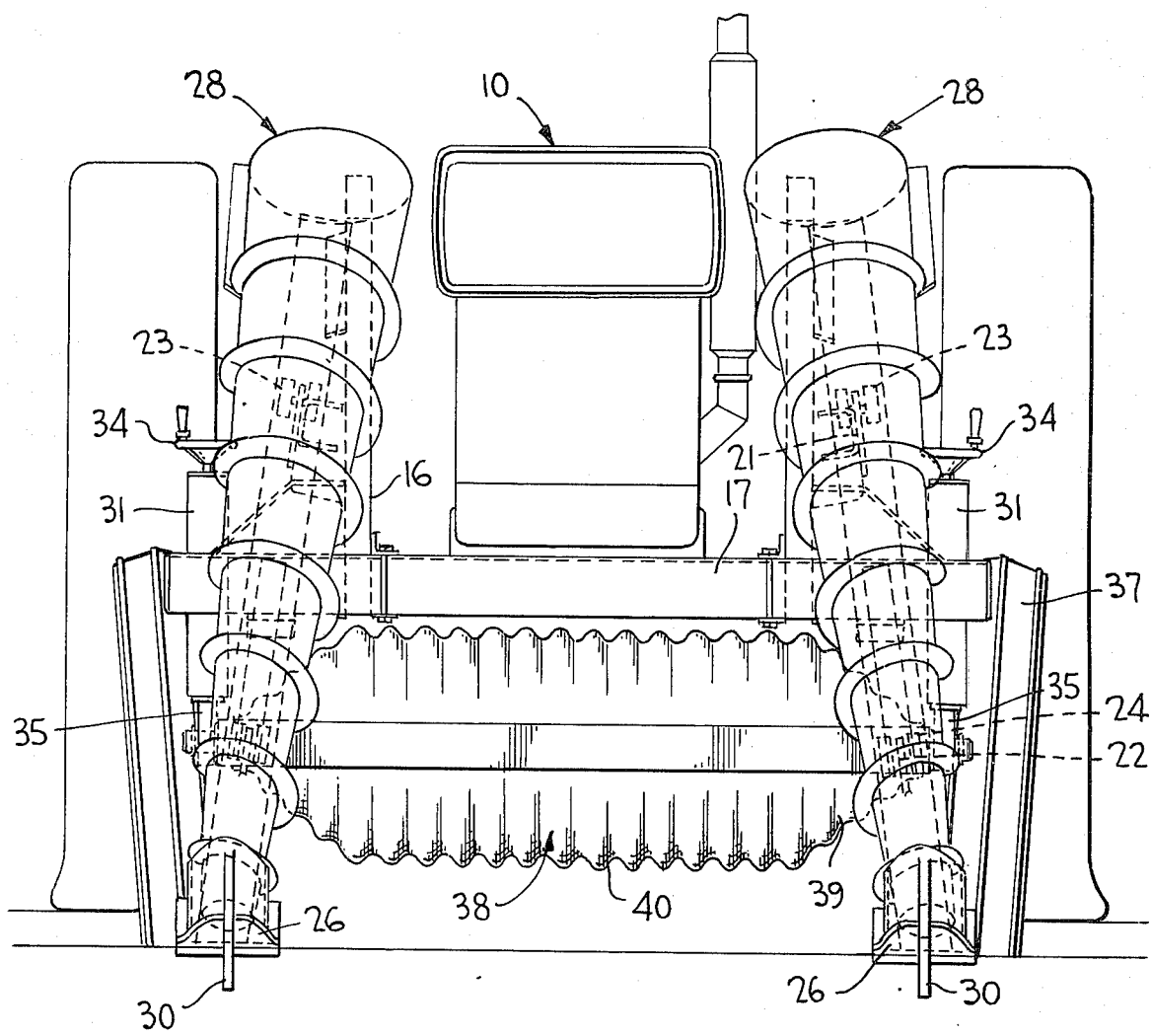
FIG. 8 is a front elevation view of the apparatus of FIG. 1.

Welded to the upper end of each beam 25 is a forwardly and upwardly extending bracket 27 and a combing element 28 in the form of an upwardly divergent tapering roller extends between each shoe 26 and bracket 27 and is rotatable in bearings in those parts. As shown in FIG. 1, a helical rib 29 extends upwardly and around each roller. As best seen in FIGS. 2 and 8 the rollers 23, 24 and the beams 25 on which they are mounted are inclined inwardly towards one another as they extend upwardly.

Each shoe 26 has welded to the leading edge thereof a forwardly and downwardly sloping tine 30.

Optionally, there may also be mounted on the apparatus a roller assembly (shown in chain lines in FIGS. 1 and 2) for partially flattening the sugar cane as it passes between the combing elements 28. When such a roller assembly is provided, the aforementioned cross-beam 17 has mounted adjacent the opposite ends thereof an upright tube 31 which passes through the beam 17. Each tube 31 has slidable within it a plunger 32 the lower end of which projects from the tube 31. Each plunger 32 is formed with a longitudinal threaded hole which is engaged by a threaded screw 33 which projects through the upper closed end of the tube 31 and has secured to it an adjusting handle 34. Thus by rotating the handle 34 the plunger 32 may be lowered further out of the tube 31 or retracted into it. The lower ends of the plungers 32 carry bearings 35 which rotatably support the opposite ends of a shaft 36 extending across the width of the tractor between the front wheels 37 of the tractor and the lower ends of the limbs 16.

A cane flattening roller 38 is secured to the shaft 36. The ends of the roller 38 are conical as indicated at 39 and both the main part of the roller and the conical ends are formed with peripheral corrugations 40.

In operation the apparatus is driven through growing sugar cane and the rollers 28 "comb" the cane and separate a narrow stretch of cane and funnel it towards the flattening roller 38. Although the rollers 28 may be freely rotatable they are preferably driven and in the arrangement shown they are each driven by an hydraulic motor 41 carried on the upper bracket 27 supporting the roller. The rollers are driven in such a direction that the helical ribs on their surface tend to lift the tangled cane clear of the ground as it passes between the rollers. The cane "combed" between the rollers then passes under the flattening roller 38 which presses the combed cane towards the ground to form a continuous swathe of cane.

At the same time the beams 25 on which the rollers 23, 24 are mounted are free to slide longitudinally relatively to the limbs 16 of the support structure so that the shoes 26 may at all times remain in contact with the ground despite undulations in the ground surface.

The adjustable support 31, 32, 33, 34 for the flattening roller 38 enables the position of the roller to be adjusted up and down with respect to the support structure to accommodate different forms of cane cultivation. For example cane is normally grown on ground which is formed in ridges and furrows for irrigation purposes and in some fields cane may be grown on the ridges and in other fields the practice may be to grow the cane in the furrows. In the case where the cane is grown on the ridges it will clearly be necessary for the roller 38 to be higher with respect to the support structure since the shoes 26 will be disposed within the furrows on either side of a ridge. Similar considerations apply when the cane is flattened by a simple crossbeam and for this reason the cross-beam may be adjustable up and down.

The tapered ends 39 of the roller allow the roller to descend partially into a furrow in the case where cane is grown in the furrow, the overall width of the roller being of the same order as the width of the furrow.

In an alternative form, not shown, the roller tapers so as to increase in diameter towards its ends. This arrangement, with possible a high rim at the extremities of the roller, will tend to push the cane inwards towards the center of the roller thus facilitating the formation of the swathe.

In another modification the rollers 28 may be replaced by stationary, i.e. non-rotatable combing elements. Also the flattening roller 38 may be positively rotated by a separate motor, such as an hydraulic motor, or from a power take-off shaft on the tractor.

The apparatus described, in forming the continuous swathe of cane will tend partially to untangle the cane.

Also the flattening of the cane will break off a proportion of the cane near the base which eases the work required from a cutter which, according to the invention, is subsequently passed through the flattened cane in the same direction as it was flattened to sever the cane adjacent the base. A suitable cutter will now be described with reference to FIGS. 4 to 7.

Figure 3:
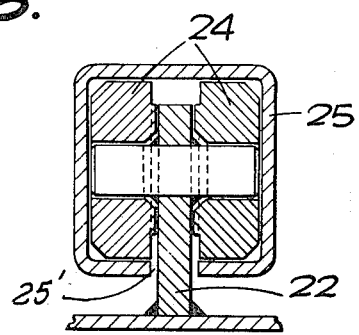
FIG. 3 is a section on an enlarged scale on the line 3—3 of FIG. 1.

The cutter shown in FIGS. 4 to 7 is suitable for mounting on a tractor and it may be mounted at the rear end of the same tractor which carries the flattening apparatus of FIGS. 1 to 3 so that the flattening and cutting of the cane is effected in a single pass. Alternatively the cutter may be mounted on another tractor or other suitable vehicle which carries out a second pass over the continuous swathe of flattened cane after the flattening apparatus has made its pass.

The cutter is mounted on the conventional three-point linkage of the tractor 10 and is carried by a support structure 42 which comprises a square-section cross-beam 43 having two spaced forwardly extending brackets 44 which are pivotally connected at 45 to the lower draft links (not shown) of the tractor. A further inverted V-shaped bracket 46 extends upwardly from the cross-beam 43 and is pivotally connected at 47 to the central top link (not shown) of the tractor.

A structure 48 extending rearwardly from the cross-beam 43 has mounted on it two cutter assemblies (indicated generally at 49) symmetrically disposed on either side of the central longitudinal axis of the tractor. The two cutter assemblies 49 are substantially identical and only one will be described in detail.

Each cutter assembly comprises, at its upper part, a transmission casing 50 having bearings in which is rotatable a horizontal shaft 51. A gear transmission couples the shaft 51 with a vertical shaft 52 (see FIG. 7) which extends down through a further casing 53 and to which the cutter blades are connected in a manner to be described.

Figure 4:
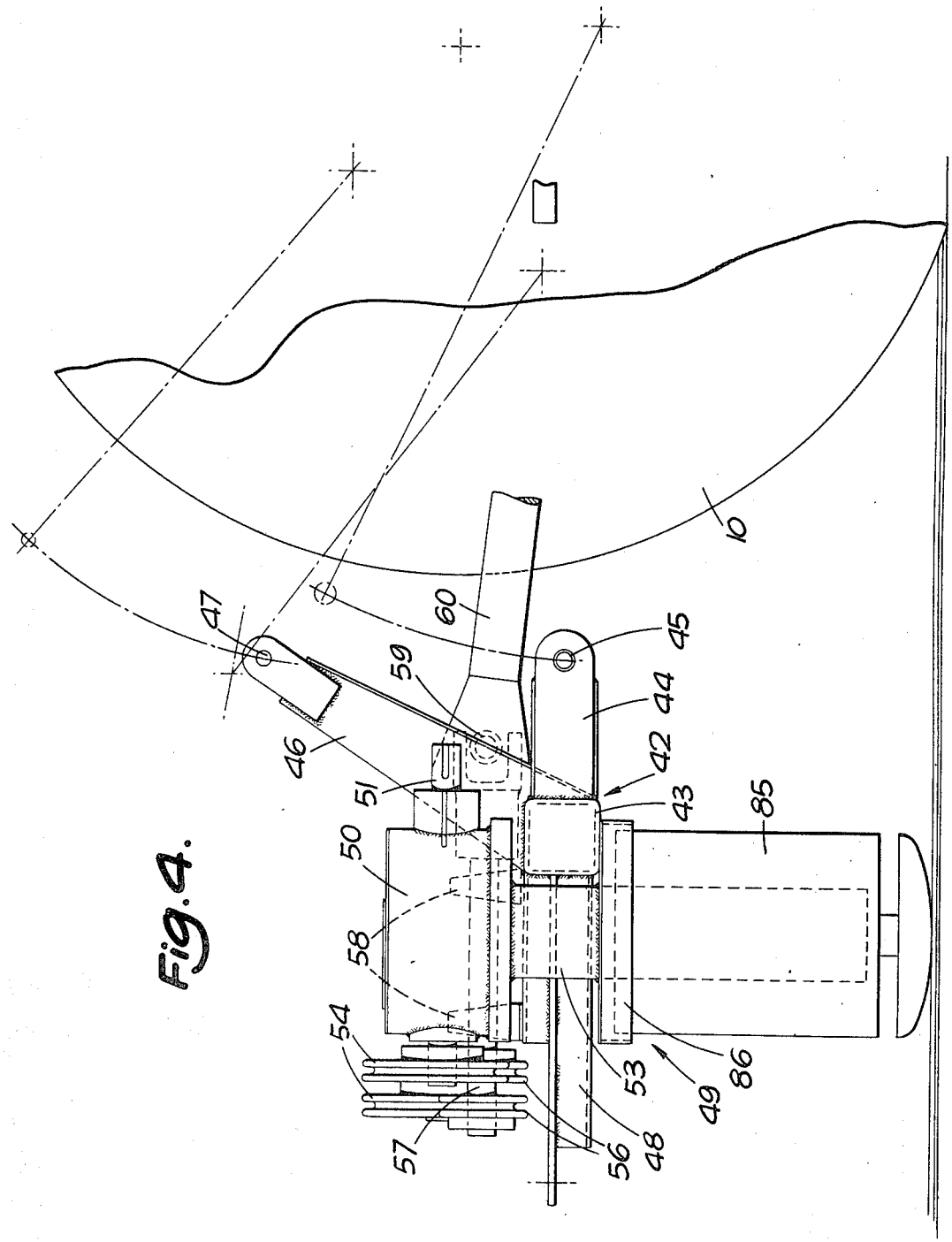
FIG. 4 is a side elevation of apparatus, mounted on a tractor, for severing growing sugar cane (certain parts being omitted for clarity)
Figure 5:
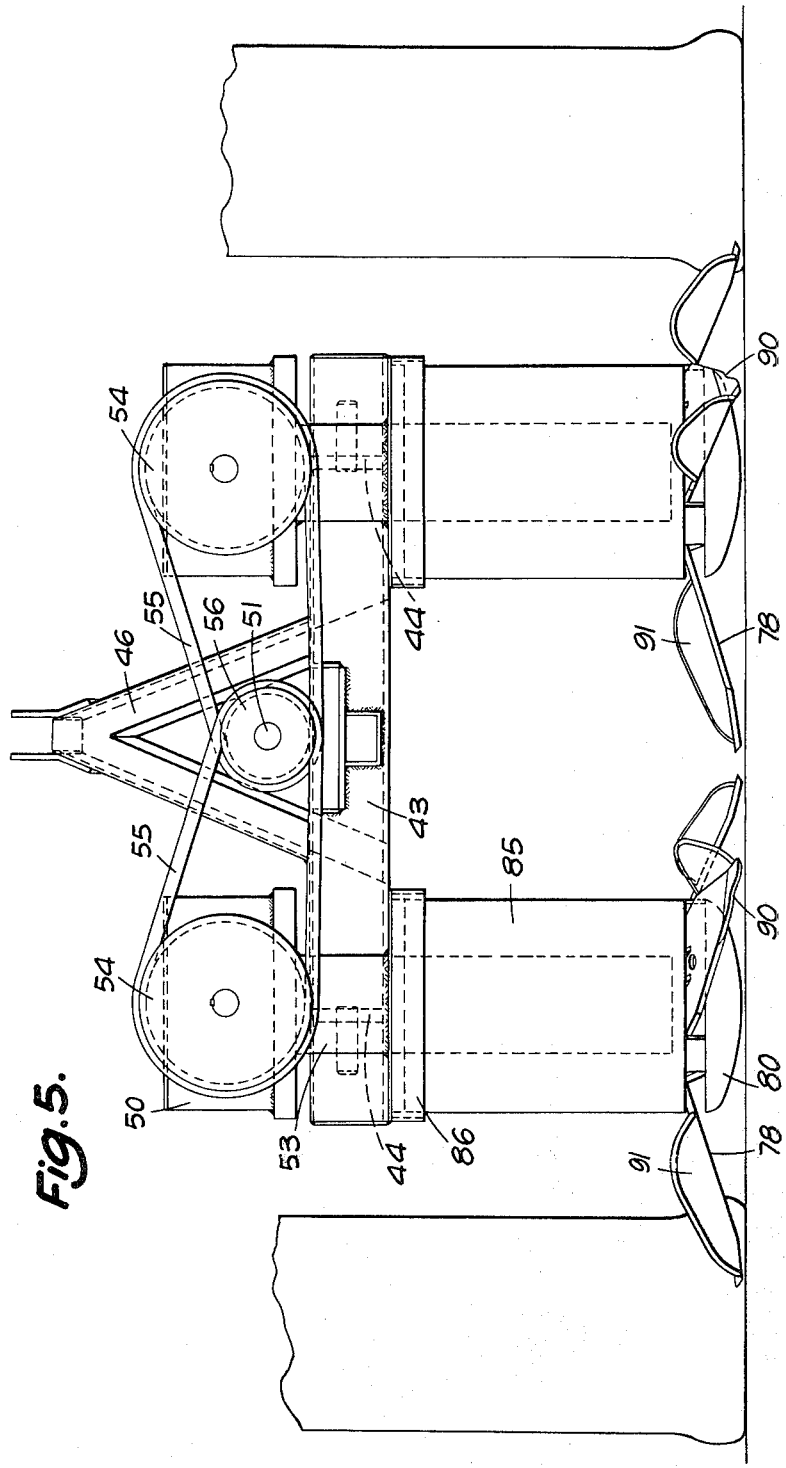
FIG. 5 is a rear elevation of the apparatus shown in FIG. 4.

The shaft 51 has mounted on the rear end thereof a sprocket wheel 54. An endless driving chain 55 encircles the sprocket wheel 54 and a further sprocket wheel 56 mounted on a shaft 57 which is rotatable in bearings 58 mounted on the structure 48. The end of this shaft 57 remote from the sprockets 56 is connected through a universal coupling 59 with the power take-off shaft 60 of the tractor. As best seen in FIG. 4 the sprockets 54 of the two cutter assemblies and the pulleys 56 are staggered fore and aft. The power take-off shaft 60 thus transmits a drive through the endless chain transmission to the two vertical shafts 52.

Figure 7:
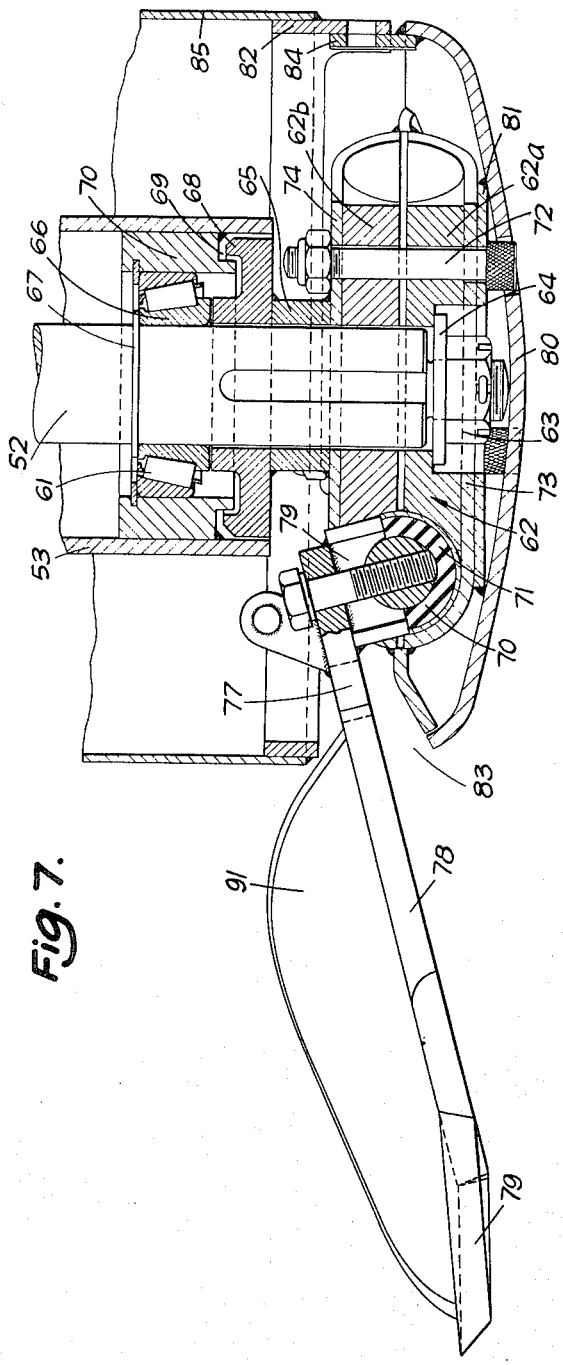
FIG. 7 is an enlarged vertical section through the lower part of one of the cutters in the apparatus of FIGS. 4 to 6.

As best seen in FIG. 7 the lower end of each shaft 52 is rotatable in bearings 61 within the lower end of the tube 53. A hub 62 is keyed onto the lower end of the shaft 52 being clamped by a clamping nut 63 between a washer 64 and a spacer 65 which engages the inner race 66 of the bearing 61. The race 66 of the bearing is retained on the shaft 52 by a spring clip 67.

The spacer 65 includes an upstanding flange 68 which rotates within a recess 69 in an annular ring 70 which surrounds the bearing 61 within the tube 53. The spacer 68 thus protects the bearing 61 and prevents foreign matter finding its way up onto the bearing.

The hub 62 has pivotally mounted within it three equally spaced horizontal and tangential shafts 70. Each shaft is supported within the hub by a bonded rubber bush 71 so that rotation of the shaft takes place against the resilient restraint of the bush. To facilitate assembly of the shafts 70 in the hub 62, the hub is formed in two parts 62a and 62b which are clamped together by bolts 72, the two parts 62a and 62b being enclosed between the two parts 73 and 74 of a two part metal casing. The upper part 74 of the casing is welded to the spacer 65.

The opposite ends of each shaft 70 project into a cutaway portion 75 (see FIG. 6) of the hub and secured to the ends of each shaft by screws 76 are the limbs 77 of the forked end of a cutter blade 78. A shaped block 79 welded to each limb of the cutter blade partially embraces each end of the shaft.

Each cutter blade 78 extends outwardly and downwardly away from its associated shaft 70 and is formed at its outer extremity with an inclined cutting portion 79. The leading edge of the outer cutting portion of each blade is formed with a notch 90 (see FIG. 6) which tends to catch the stems of the sugar cane and increases severance efficiency. Also the trailing edge of each blade is formed with an upswept portion 91. This causes the blades to tend to lift the sugar cane as they sever it. This "aerates" the swathe of cane to help free trash from the cane to make hand recovery of the cane easier. Also it prepares the cane for easier operation of any following-and-elevating device which may be used, after the apparatus described has passed through the cane, for mechanically gathering the cut cane.

The lowermost part of each cutter comprises a domed cap 80 which is welded to a plate 81 which is clamped to the hub 62 by the aforementioned bolts 72. Disposed above the cap 80 is a ring 82 of equal diameter. The ring 82 and cap 80 are cut-away to provide apertures, as at 83 through which the cutter blades 78 project and which are of sufficient size to permit up and down pivoting movement of the cutter blades on the shafts 70. The ring 82 and cover 80 are secured together between the cutter blades 78 by welded distance pieces 84.

The ring 82 has welded to it the lower end of a drum 85 which encircles the tube 53. The upper end of the drum 85 is located by three ball races triangularly disposed riding inside a ring 86 (see FIG. 4) carried by the support structure 42.

Figure 6:
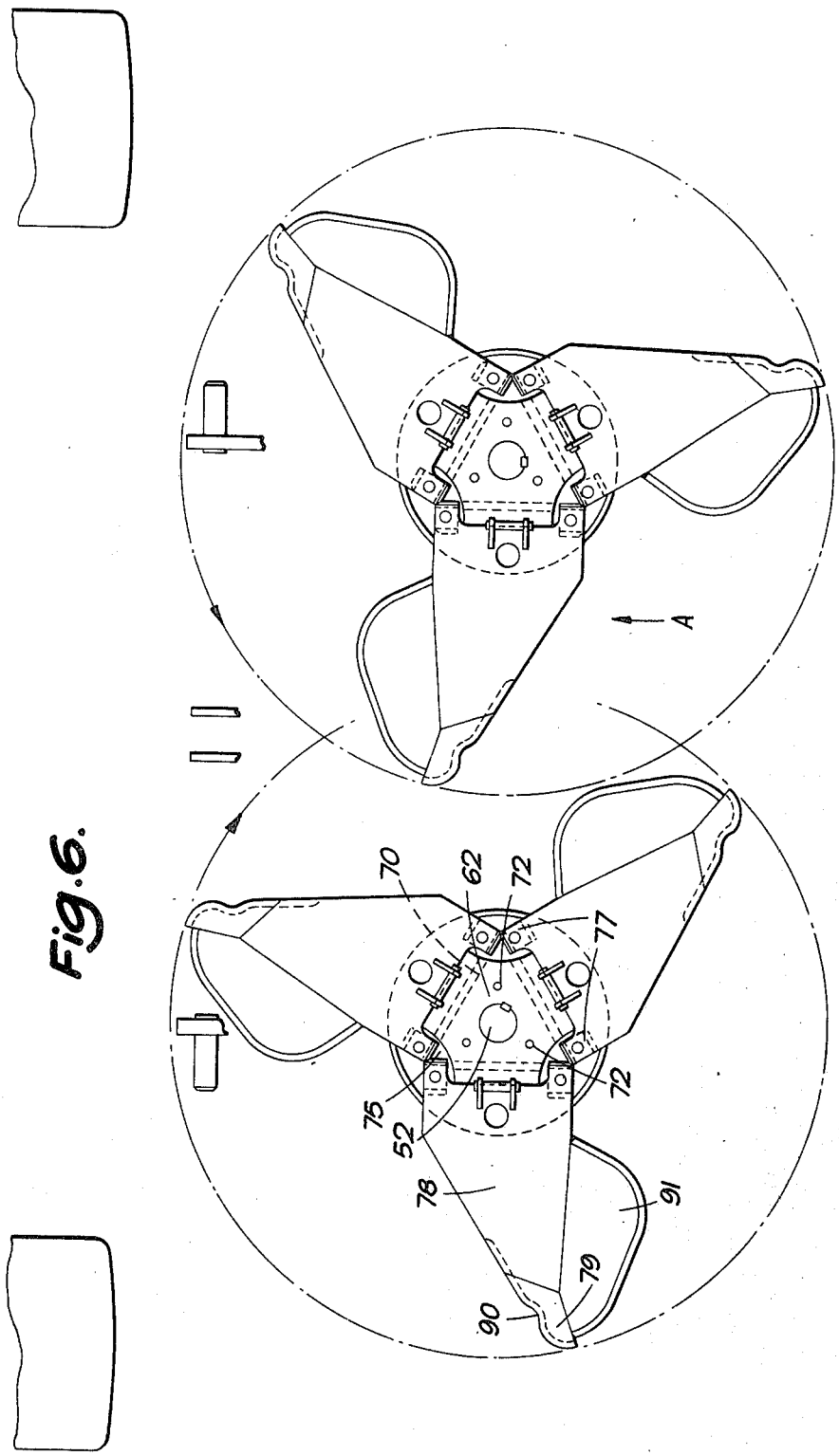
FIG. 6 is a plan view of the cutter blades used in the apparatus of FIGS. 4 and 5.

The blades of the two cutter assemblies are oppositely handed and the transmission for the cutters causes them to contra-rotate in synchronism. As best seen in FIG. 6 the cutter blades rotate in the directions indicated by the arrows when the apparatus is moving in the direction of the arrow A.

The cutter blades 78 sever the flattened cane adjacent the ground and since the blades are capable of flexing up and down resiliently relatively to the rotating hub it is possible for the blades to follow the contours of uneven ground without digging into the ground or riding over any cane stalks. This is important since, as mentioned above, sugar cane is normally grown on ground formed into ridges and furrows.

During operation fo the cutter the links at the rear of the tractor may be put in their "floating" condition so that the cutter assemblies rest on the ground under their own weight and follow the contours of the ground.

The drums 85 engage the cane and help to throw it rearwardly as it is cut by the cutter blades and the drums may be fitted with rubber pads, flutes, paddles, or other devices to increase their grip on the cane. The fact that the cutters and drums rotate inwardly and do work on the cane only between their axes, exerts a forward thrust on the tractor and helps to overcome loss of traction through wheel slip.

The leading edges of the cutter blades 78 are swept back, to keep them clear of trash.

We claim:

1. Apparatus, adapted to be mounted on a propelling vehicle, for cutting sugar cane comprising: two upwardly extending combing elements spaced apart across the width of a corresponding vehicle, a flattening element extending transversely to the direction of travel of such vehicle and spaced above the ground to the rear of the combing elements with respect to the intended direction of travel of such vehicle, a cutter mounted on such propelling vehicle to the rear of the flattening element, and means for transmitting a powered drive to the cutter, which cutter is adapted to sever, adjacent the ground, sugar cane flattened by the flattening element, wherein the cutter includes a central rotatable hub assembly, a number of cutter blades extending outwardly from the lower end of the hub assembly, and means pivotally connecting the blades to the hub assembly along axes which permit each blade to swing up and down relative to the hub assembly and follow the contours of the ground along which such vehicle travels.

2. Apparatus according to claim 1 wherein resilient restraining means are provided to oppose the up and down swinging movement of each blade, said resilient restraining means being connected between a perspective said blade and said hub assembly.

3. Apparatus according to claim 2 wherein the resilient restraining means comprise a bush of resiliently flexible material provided in each pivotal connection between each blade and the hub assembly.

4. Apparatus according to claim 2 wherein the cutter is adapted for free up and down movement with respect to the propelling vehicle and has a part projecting below said cutter blades whereby in operation said part engages the ground under the weight of the cutter and follows the contour of the ground.

5. Apparatus according to claim 2 wherein the cutter comprises three outwardly extending blades equally spaced around the axis of rotation of the hub assembly.

6. Apparatus according to claim 2 wherein there are provided two cutters adapted to be mounted on such a vehicle, the axes of rotation of the two cutters being spaced apart transversely to the direction of travel of such vehicle.

7. Apparatus according to claim 6 wherein the path described by the blades of one cutter, as it rotates, overlaps the path described by the blades of the other cutter, the blades of one cutter projecting into sapces between the blades of the other cutter.

8. Apparatus according to claim 1 wherein the flattening element comprises a roller rotatable about an axis extending transversely to the direction of travel of the vehicle and wherein the surface of the roller is formed with peripherally extending corrugations.

9. Apparatus according to claim 8 wherein the roller is of reduced diameter towards the opposite ends thereof.

10. Apparatus according to claim 1 wherein the combing elements are inclined towards one another as they extend upwardly.

11. Apparatus according to claim 1 wherein the combing elements are inclined rearwardly, with respect to the direction of travel of the vehicle, as they extend upwardly.

12. Apparatus according to claim 1 wherein each combing element is adapted for free up and down movement with respect to the propelling vehicle whereby in operation each element rests on the ground under its own weight and follows the contours of the ground.

13. A method of cutting sugar cane comprising the steps of: passing in one direction through the growing cane a vehicle having mounted thereon two upwardly extending power driven combing elements spaced apart across the width of the vehicle; combing a narrow stretch of cane between the combing elements; flattening the cane beneath a flattening element mounted on the vehicle to the rear of the combing elements and spaced above the ground to extend transversely to the one direction; and severing the cane at its base by power driven rotating ground-following cutting means mounted on the vehicle to the rear of the flattening element.

14. A system to be utilized in cutting sugar cane, the system comprising in combination: a motor driven vehicle and sugar cane cutting apparatus as defined in claim 1 mounted on said vehicle.

* * * * *